(12) United States Patent
Hehl

(10) Patent No.: US 12,549,408 B2
(45) Date of Patent: Feb. 10, 2026

(54) CONTROL DEVICE AND METHOD FOR TRANSMITTING CONTROL COMMANDS

(71) Applicant: Bayerische Motoren Werke Aktiengesellschaft, Munich (DE)

(72) Inventor: Fabian Hehl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/671,813

(22) Filed: May 22, 2024

(65) Prior Publication Data

US 2024/0430126 A1 Dec. 26, 2024

(30) Foreign Application Priority Data

Jun. 23, 2023 (DE) ..................... 10 2023 116 587.9

(51) Int. Cl.
*H04L 12/40* (2006.01)
(52) U.S. Cl.
CPC .................. *H04L 12/40013* (2013.01); *H04L 2012/40273* (2013.01)
(58) Field of Classification Search
CPC ............... H04L 12/40013; H04L 2012/40273
See application file for complete search history.

(56) References Cited

U.S. PATENT DOCUMENTS

| | | | |
|---|---|---|---|
| 10,598,703 B2 * | 3/2020 | Douglass | G01R 31/74 |
| 11,005,680 B2 * | 5/2021 | Park | H04L 12/40 |
| 2011/0140902 A1 | 6/2011 | Huss et al. | |
| 2014/0022912 A1 * | 1/2014 | Kim | H04L 12/40163 370/244 |
| 2018/0144640 A1 * | 5/2018 | Price | G05D 1/0055 |
| 2022/0102966 A1 * | 3/2022 | Tan | G01R 31/006 |
| 2022/0274542 A1 * | 9/2022 | Kurokawa | H04L 12/40026 |
| 2023/0059620 A1 * | 2/2023 | Kong | G11C 7/1045 |
| 2023/0294621 A1 * | 9/2023 | Geula | B60R 16/033 |
| 2024/0217365 A1 * | 7/2024 | Morrison | B60L 3/0092 |
| 2025/0042464 A1 * | 2/2025 | Van Rooyen | B62D 5/0418 |

FOREIGN PATENT DOCUMENTS

| | | | | |
|---|---|---|---|---|
| DE | 10 2022 126 936 A1 | 5/2023 | | |
| WO | WO-2021043866 A1 * | 3/2021 | | B60L 15/20 |

OTHER PUBLICATIONS

German-language German Search Report issued in German Application No. 10 2023 116 587.9 dated Feb. 20, 2024, with partial English translation (6 pages).

* cited by examiner

*Primary Examiner* — Henry Tsai
*Assistant Examiner* — Christopher A Daley
(74) *Attorney, Agent, or Firm* — Crowell & Moring LLP

(57) ABSTRACT

A control device a functional zone of a motor vehicle includes a uniform communication interface, and controls at least one functional unit of a plurality of functional units in the functional zone. The control device establishes a uniform communication link to at least one functional unit in the functional zone via the uniform communication interface, and to transmits control commands for controlling the functional unit to the functional unit via the uniform communication link using a communication standard. The control device has at least one eFuse actuation system that couples in the control commands onto the communication link by means of a modulation method.

10 Claims, 3 Drawing Sheets

CONTROL DEVICE AND METHOD FOR TRANSMITTING CONTROL COMMANDS

CROSS REFERENCE TO RELATED APPLICATION

This application claims priority under 35 U.S.C. § 119 from German Patent Application No. DE 10 2023 116 587.9, filed Jun. 23, 2023, the entire disclosure of which is herein expressly incorporated by reference.

BACKGROUND AND SUMMARY

The present disclosure relates to a control device of a functional zone of a motor vehicle comprising a uniform communication interface for controlling at least one functional unit and/or to a method for transmitting control commands to at least one functional unit of a plurality of functional units of a motor vehicle. In addition, or as an alternative, a computer program is provided, which comprises commands which, when the program is executed by a computer, cause the computer to execute the method at least in part. In addition, or as an alternative, a computer-readable medium program is provided, which comprises commands which, when the commands are executed by a computer, cause the computer to execute the method at least in part.

In modern motor vehicles, a large number of communication lines currently run between a central control unit and the control devices of a functional zone on account of the different communication technologies. LIN, CAN, FlexRay and Ethernet may be provided. This causes complex and costly wiring in the cable harness. In addition, many of the functional units in the functional zones very often have to be redeveloped or undergo technical changes when E/E functionalities (electrical/electronic functionalities) in the functional units change. This further increases the complexity of the communication and may lead to additional costs for technical changes and/or redevelopments. Moreover, in known systems, in the control devices of the functional zone, there are a plurality of different communication interfaces to the functional units located in the functional zone, these many different communication interfaces resulting from the different communication technologies. This limits the flexibility of the control device(s) of the functional zone in terms of equipment and variance of the functional units located in the functional zone and thus, due to possible technical changes or redevelopments, the long-term use of these zone control units.

Against the background of this prior art, the object of the present disclosure is to specify a control device and/or a method which are suitable for enhancing the prior art.

The object is achieved by the features of the independent claims. The content of each of the subordinate claims and the dependent claims is optional developments of the disclosure.

Accordingly, the object is achieved by a control device of a functional zone of a motor vehicle, comprising a uniform communication interface, for controlling at least one functional unit of a plurality of functional units in the functional zone. The control device is further designed to provide a uniform communication link to at least one functional unit in the functional zone via the uniform communication interface. The control device is further designed to transmit control commands for controlling the functional unit to the functional unit via the uniform communication link using a communication standard. The control device has at least one eFuse actuation system, which is designed to couple the control commands into the communication link by means of a modulation method.

The control device or the control unit may be part of or represent the driving assistance system. For example, the control device may be an electronic control unit (ECU). The electronic control unit may be an intelligent processor-controlled unit, which can communicate with other modules, for example via a central gateway (CGW), and which may form the vehicle on-board electrical system by means of field buses, such as the CAN bus, LIN bus, MOST bus, FlexRay and/or via the automotive Ethernet, for example together with telematics control units and/or an environmental sensor system.

It is conceivable that, for the driving behavior of the motor vehicle, the control device controls relevant functions, such as the steering, the engine control, the power transmission and/or the braking system. In addition, driver assistance systems, such as a parking assistance system, adaptive cruise control (ACC), a lane keep assistance system, a lane change assistance system, a traffic sign recognition system, a light signal recognition system, a start-up assistance system, a night vision assistance system and/or an intersection assistance system, for example, can be controlled by the control device. Driver assistance systems are increasingly being installed in modern motor vehicles, in particular automobiles. (Advanced) driver assistance systems ((A)DAS) are electronic, in particular mechatronic, installations in motor vehicles for supporting the driver in certain driving situations. In this case, safety aspects, but also the increase in driving comfort, are often the focus. Driver assistance systems may have functions to automatically separate high-voltage sources of a BEV (battery-electric vehicle) and PHEV (plug-in hybrid vehicles) motor vehicle from the high-voltage system.

In the context of the present disclosure, a motor vehicle may have different functional zones. A functional zone may be an area in which various technical functions of the motor vehicle are integrated and executed. It may be an area in which the most important components and systems necessary for the operation of the motor vehicle and the provision of a function and/or its functions are provided. A functional zone may optionally be a zone in which several thematically connected functions are executed. A zone may optionally be given by a certain part of the motor vehicle, such as a door area, a roof area, or similar.

In the context of the present disclosure, a uniform communication interface is to be understood as an interface which is designed to establish a communication link with different functional units which optionally use a different communication standard. To this end, the uniform communication interface may have an equal number of pins and wiring elements for contacting a communication medium.

In the context of the present disclosure, a functional unit is understood to mean a unit and/or a specific component and/or a subsystem which performs a specific function within the functional zone of the motor vehicle. The functional unit is a stand-alone unit which is embedded in the functional zone and designed for smooth operation and/or functioning of the vehicle. A plurality of functional units may be provided in one functional zone. The functional unit has an interface for communication with the control device of the functional zone. The functional units of a functional zone have a uniform communication interface for connection and communication with the communication interface of the control device. The functional units may have a logic system for communication and for implementing the function. The functional units may be designed as an electronic control unit (ECU).

In the context of the present disclosure, an eFuse actuation system can be understood to mean a controller or a unit for activating electrically programmable fuses (eFuses) for circuits or systems of the motor vehicle. eFuses may be used in the automotive industry to implement various electrical functions and/or protective devices. The eFuse actuation system may refer to the mechanisms and/or circuits which are used to control and/or program the state of the eFuses of a control device.

In semiconductor technology, "efuse" may refer to an electrically programmable fuse. These may be specific circuits used in integrated circuits (ICs) to establish or disconnect connections. An efuse may have a structure which is made of specific material and may be described as a fusible line or silicon oxide. This structure may be programmed to establish or disconnect a connection by applying a sufficiently high current. The eFuses may be activated using specific programming circuits and signals. These circuits may produce the necessary electrical conditions to generate the programming current and program the eFuses accordingly. The eFuse actuation system may also include the necessary logic circuits and/or control signals to initiate and/or monitor the programming process. eFuses may be used as protective devices for various electrical circuits in the motor vehicle. eFuses may also be used for rapid switching of signals.

In the context of the present disclosure, communication standards refer to established rules, protocols, and standards which may allow information to be exchanged between different units, systems or networks. The communication standards may be used as a common language and allow smooth communication and interoperability between different units. Communication standards may define the structure, format, syntax, semantics, and/or behavioral rules for the exchange of data and information. They may ensure that the transmitters and receivers use the same methods and conventions to interpret and process information.

In the context of the present disclosure, "modulation method" refers to the techniques in which information or data are modulated onto a carrier signal in order to transmit this information or data via a communication link by means of a communication medium. The modulation changes the characteristics of the carrier signal, such as amplitude, frequency or phase, depending on the data to be transmitted. This allows the data to be transmitted and then demodulated and recovered on the receiving side.

The device described above offers a number of advantages in this case. Among other things, provision may be made for the communication medium to require only a very small number of electrical lines to establish the communication link. Provision may be made for all functional units of a functional zone and the control device of the functional zone to be connected to an equal number of electrical lines. The electrical lines and the communication interfaces may be unified and standardized. Reuse over several generations of control devices and/or functional units is made possible. The control device can still be used even in the event of a replacement or redevelopment of the functional units.

It may also be advantageous that the logic implemented in the functional units may be limited to the minimum functionality. The processing of the functionality may be outsourced to the control device and/or another superordinate unit in the motor vehicle. Only control commands to the functional unit may be provided for execution. Calculation-intensive processing on the functional units and thus the design thereof may be dispensed with due to the outsourcing.

Possible further developments of the device described above are explained in detail below.

Provision may be made for the communication standard to be selected from a group comprising at least LIN, CAN, Ethernet and CAN-FD. Using the control device according to the disclosure, various communication standards for communication with the functional unit of the functional zone may be implemented using a uniform communication interface. As a result, the communication standard of the functional unit does not need to be adapted for a new generation and/or further development of the functional unit. The control device of a functional zone may also be used over several generations and no adjustment is required.

The LIN (Local Interconnect Network) is a serial communication standard which has been provided specifically for communication in motor vehicles. The LIN provides a cost-effective and easy way to connect different electronic control units in the vehicle to one another. LIN is distinguished by the fact that it is easy to implement and cost-effective. Simple hardware comprising a single cable bus and a master-slave communication mode may be used. This makes the necessary components and the cabling simpler and more cost-effective. LIN operates at a low data rate of about 20 Kbit/s. This low data rate is sufficient for many applications in motor vehicles where only limited amounts of data have to be transmitted, including control commands or status information. LIN provides deterministic communication which enables the transmission of data in a predictable manner. This enables precise synchronization between the control device and the functional units and reliable communication in real time. LIN is optimized for operation at a low power consumption. LIN may be used in various areas of the motor vehicle, including lighting control, window lifters, seat adjusters, switch units and other simple electronic functions. The CAN (Controller Area Network) bus is a communication protocol which is provided specifically for use in motor vehicles. It enables data communication between various electronic control devices and functional units in the motor vehicle, including engine control, brakes, airbags, air-conditioning systems, multimedia systems and others. The CAN-FD (Controller Area Network Flexible Data Rate) is a further development of the CAN (Controller Area Network) protocol. This may improve data transmission rates and the flexibility of the CAN bus in order to meet the increasing demands of modern motor vehicles and industrial applications. Ethernet is a communication protocol which may be used in the automotive industry for interconnecting various electronic control devices and systems in motor vehicles. It is based on the Ethernet technology which was originally developed for data communication in computer networks.

Provision may be made for the coupling—in to be carried out galvanically, inductively, capacitively, by wave coupling, by beam coupling and/or directly by actuation of an eFuse. The coupling—in may be used to transmit a control command in a specific format via the uniform communication interface and the uniform communication link.

Galvanic coupling-in may be carried out through the direct electrical connection between two electronic components or circuits by way of a line or cable. In this case, the electric current flows directly from one component to another component. Galvanic coupling-in may be carried out by directly connecting a cable between two components. Inductive coupling-in may refer to the transmission of electrical energy or signals between two components by electromagnetic induction. This creates a magnetic field which is transmitted from one component to the other, inducing electric currents in the receiving component. Capacitive coupling-in may refer to the transmission of electrical energy or signals between two components by an electrical capacitance. This creates an electric field between the components, enabling the transfer of electrical charges. Wave coupling may refer to the transmission of signals or energy between two components via electromagnetic waves. In this case, electromagnetic waves are generated and emitted in order to transmit the information. Beam coupling may refer to the transmission of signals or energy between two components by directed electromagnetic radiation. In this case, directed radiation is generated, which is aligned with the receiving component in order to allow transmission. Coupling-in directly by actuation of an eFuse refers to the transmission of signals or energy by direct control of an electronic fuse element (eFuse). An eFuse may open or close electrical connections to allow or block the flow of current or the signal transmission. The targeted control of eFuses enables signals or energy to be coupled in between different components.

Provision may be made for the eFuse actuation system to be designed as a software unit and/or as an electronic circuit. The eFuse actuation system may be formed in software and/or executed by a microcontroller, FPGA, processor. Furthermore, the eFuse actuation system as an electronic circuit may be implemented as an integrated circuit on an IC.

Provision may be made for the communication link to be formed via a two-wire cable or three-wire cable. This means that a standardized communication link which is limited to a minimum number of wires may be used. This may reduce the complexity of the communication. Furthermore, the reduced number of wires can reduce the weight of the wires and thus the total weight of the vehicle.

Provision may be made for the control device to have a storage unit for storing an assignment table and, in the assignment table, the control commands which can be transmitted to be assigned to the corresponding functional units. The storage unit may be designed as non-volatile memory. The assignment table may be designed as a lookup table (LUT) or implementation table in order to statically define information and to use it at the runtime of the program—in order to avoid complex calculations or high memory consumption. Provision may be made for a fixed equivalent value to be defined for an entry. Provision may thus be made for a specific functional unit to be assigned to a specific command. This means that this command is forwarded to and executed by this specific functional unit in the functional zone.

What is described above may be summarized in other words and with reference to a possible more concrete embodiment of the disclosure as described below, with the following description being interpreted as not limiting to the disclosure.

Technology-independent communication tunneling between a central control unit and zone control units can be provided in combination with semiconductor-based communication technology within the zones.

Two major trends in E/E development in the automotive sector can be implemented. These may be the trend toward zoning and the trend toward centralization. The abbreviation E/E stands for electrics/electronics. Zoning may include a control unit within a zone, for example the roof zone, combining as much E/E functional logic as possible and the other control units in the zone, comprising lighting control units in the roof liner, having as little E/E functional logic as possible and being largely limited to basic E/E functionality. The advantage of control units which are limited to basic E/E functionality as far as possible may be that these control units may be used over several component/vehicle generations without any technical changes. A prerequisite for this may be that uniform hardware and software interfaces are available to the zone control units. Only the zone control units are replaced in shorter cycles, as they contain the E/E functional logic which will change frequently, especially if the E/E function has not yet reached a certain degree of maturity. This may save development and protection costs at the zone level. The communication between the zones may usually take place via the zone control units.

There is also a trend toward centralization. Centralization means that more and more E/E functional logic may be combined in one central control unit. The E/E functional logic of the zone control units is in this case also transferred to the central control unit as far as possible. As a result of this development, the zone control units will only represent the communication endpoints from the central control unit to the respective zones in the medium term. In specific terms, this may mean that, on account of the centralization, the zone control units only form the physical connection of the other control units located in the zone and control the communication from and to the central control unit. The communication between the central control unit and the zone control units may take place by means of several communication technologies, including LIN, CAN, CAN-FD, FlexRay and Ethernet, and respective separate communication lines. The separate communication lines run parallel to one another and are cost drivers in the wiring harness design.

The following requirements may result from the two trends of zoning and centralization and should be taken into account in the development of E/E vehicle systems. The communication (communication technology, messages, signals, etc.) between the central control unit and the control units in the zones may remain the same over generations. The background to this is the maintenance of the hardware and software interfaces of the control units located in the zones and thus the avoidance of costs for technical changes or redevelopments of control units. A reduction in the number of parallel communication lines between the central control unit and the zone control units to one communication line each, due to the different communication technologies in the vehicle. This may save costs in the cable harness.

The communication interfaces between the zone control units and the control units located in the zone may be standardized. If possible, there should only be one interface on the hardware and software side of the zone control units. The background is the greatest possible flexibility in terms of equipment and variance of the control units located in the zone and the long-term use of these zone control units.

A large number of communication lines currently run between the central control unit and the zone control units due to the different communication technologies, for example LIN, CAN, FlexRay and Ethernet. This may cause induce in the cable harness that need to be reduced. In addition, many control units within the zones are very often redesigned or undergo technical changes as E/E functional components in the control units change. This in turn may lead to high costs for technical changes or redevelopments. Consequently, it may be that the control units within the zones have to be used across generations (component and/or vehicle generations).

For this purpose, it must be possible for the control units within the zones to be able to transmit their maximum E/E functional component to the zone control units or, in the medium term, to the central control unit; in addition, the hardware and software interfaces on the control units within the zones must be clearly defined. Moreover, in the zone control units, there are currently a plurality of different communication interfaces to the control units located in the zone, these resulting from the different communication interfaces. This limits the flexibility of the zone control units in terms of equipment and variance of the control units located in the zone and thus, due to possible technical changes or redevelopments, the long-term use of these zone control units. Therefore, the communication interfaces at the zone control units in the direction of the control units located in the zone must be standardized.

For this purpose, it must be possible to create a uniform hardware and software interface at the zone control units. The starting point of the disclosure may be a control unit which is installed in the motor vehicle and which unifies the largest possible proportion of E/E functional logic in the motor vehicle. The central control unit may also consist of several control unit entities which share a housing. In addition, provision may be made for several central control units for different domains such as driving, infotainment, etc. to be provided in a motor vehicle.

The central control unit may in turn be connected to one or more zone control units via a communication line to reduce the cost of the cable harness. This communication line usually requires communication technology with a high transmission rate since it is intended to be used as a communication tunnel for all communication technologies with a lower transmission rate and their messages, as well as signals transmitted between the central control unit via the zone control units and the control units located in the zone. In general, the communication line and its communication technology with a high transmission rate may be independent of technology. It may be 1000Base-T Ethernet ($\triangleq$ gigabit Ethernet) or multi-gigabit Ethernet. For Ethernet communication, a high frame size (for example 1500 bytes) is also possible, whereas only 8 bytes are possible for LIN or CAN. In addition, the interfaces on the hardware and software side in the direction of the control units located in the zone may also be simplified or standardized as far as possible. Many communication technologies currently require multiple pins and hardware lines, for example copper lines, on the zone control unit for communication and power supply. CAN communication technology requires two communication pins and two pins for the power supply to the connected control units. This results in four respective hardware lines in the case of CAN communication technology and thus costs for the cable harness. In order to enable maximum connection flexibility at the zone control unit with regard to equipment and variance of the control units located in the zone and to be able to use these zone control units across generations, it is sensible to restrict the communication and power supply to only the supply lines, regardless of the communication technology. Another advantage of this may be the cost savings in the cable harness.

The control units located in the zone may each be connected to the zone control units via a communication line. The control units located in the zone may communicate with the zone control unit via various communication technologies, for example LIN, CAN and CAN-FD, on the one hand or with the central control unit via the communication tunnel on the other. In addition, the control units located in the zone should have the longest possible service life and may therefore be able to be used across component and vehicle generations. This means that the communication technology selected in the development of these control units, for example CAN, must be used over several component and vehicle generations and must therefore be operated by the corresponding zone control unit or transmitted by the corresponding zone control unit to the central control unit. If the zone control unit transmits this communication to the central control unit across generations, this communication technology must also be able to be "addressed" or operated by the central control unit across generations. It may be important in this case that, in addition to the control units located in the zone, all actuators and sensors located in the zone can also be connected. In summary, several SW units and HW units are to be partitioned on the control units listed so far in order to be able to represent technology-independent communication tunneling between a central control unit and zone control units in combination with semiconductor-based communication technology within the zones. The communication via the communication tunnel between the central control unit and the zone control units should take place in both directions. These control units may be designed as both transmitters and receivers. A communication tunnel control SW unit in the central control unit and the zone control units is required to implement the communication tunnel. The communication tunnel control SW unit may be used for packing or unpacking messages from communication technologies (for example CAN messages) which are transmitted via the communication tunnel using the communication technology of the communication tunnel (for example gigabit Ethernet). By analogy with a freight train, the communication tunnel control SW unit takes over the task of loading and unloading a freight train. This allows as much functional logic as possible to be combined in the central control unit and communication from the central control unit to the control units located in the zones via various communication technologies over several component or vehicle generations. In addition, the cable harness between the central control unit and the zone control units can be relieved of load.

In addition to the communication tunnel control SW unit, the gateway SW unit, the eFuse actuation system SW and/or HW unit and eFuses ($\triangleq$ HW units) must be installed in the zone control units. Specifically, a description is given of the application case in which the central control unit can transmit messages to the control units located in the zone via the communication tunnel and a zone control unit independently of the communication technology. The opposite way, that is to say the control units located in the zone can transmit messages to the central control unit via a zone control unit and the communication tunnel. The communication tunnel control SW unit in the zone control unit unpacks messages which are to be transmitted from the central control unit to the control units located in the zone. There are now several control units present in the zone to which the messages can be transmitted. Consequently, a gateway SW unit may be required, which knows which message is to be transmitted to which control unit in the zone and which control units in the zone are not to receive this message. In a simplified and graphical representation, the gateway SW unit has a large table with all messages in the vehicle on the left and a separate table on the right for each control unit in the zone. This enables correct assignment of the messages. The eFuse actuation system may be a SW unit and/or additionally require electronic circuitry, that is to say a HW unit, and represents the link between the gateway SW unit and the eFuses ($\triangleq$ HW units). eFuses may be electronic fuses which are designed as integrated circuits and perform the functions of conventional fuses. This means that a control unit located in the zone is connected via the line coming from an eFuse and is supplied with power or can also be disconnected from the current via this line. A transceiver that can send and receive user data via the power supply line may be integrated into the electronic circuit of the eFuse in a cost-effective manner.

It may be possible for an eFuse to supply current to several control units or to disconnect them from the current. This may depend on the communication technology used and may be implemented with LIN communication technology. Consequently, it may also be noted that the zone control units can often take over the function of a current distribution system, that is to say the distribution of power within the zone. The eFuse actuation system has the task of coupling the messages of high-frequency communication technologies, for example CAN, on the power lines to the control units located in the zone by means of modulation methods. The coupling-in may be carried out galvanically, inductively, capacitively, by wave coupling, by beam coupling or directly by actuation of an eFuse. The coupling-in by galvanic coupling, inductive coupling, capacitive coupling, wave coupling or beam coupling requires additional electronic components in the SW and/or HW unit of the eFuse actuation system. Modulation describes a method in telecommunications in which a useful signal to be transmitted changes (modulates) a so-called carrier. This enables a high-frequency transmission of the low-frequency useful signal. The transmission signal promotes a bandwidth dependent on the useful signal in the range of the carrier frequency. The eFuse actuation system in the zone control units may be able to send and receive messages.

The communication may be transmitted via the power lines to the control units located in the zone. An additional transceiver which is compatible with the transceiver integrated in the eFuse may be required in each control unit located in the zone. Staying with the application case of the transmission of messages from the central control unit through the communication tunnel via the zone control unit to the control units located in the zones, it may be described at this point that the transceiver of the control units located in the zone receives the modulated signals and decouples and decrypts them using electronic circuits and/or demodulation techniques. The coupling-out may be carried out, like the coupling-in, galvanically, inductively, capacitively, by wave coupling, by beam coupling or directly by actuation of the eFuse. The coupling-out is carried out by galvanic coupling, inductive coupling, capacitive coupling, wave coupling or beam coupling, which requires additional electronic components in the SW and/or HW unit of the eFuse actuation system. The reverse case, that is to say transmitting messages from the control units located in the zone to the central control unit via the zone control unit and the communication tunnel, also works, only in reverse order. It may also be possible, in this application case, that it is not always only the central control unit that is a recipient of a message. The same method can also be used to address other control units, for example located in another zone.

Communication in a motor vehicle is provided between a central control unit and a lighting control unit, located in the roof zone, for the right-hand seat of the second row of seats. The lighting control unit for the right-hand seat in the second row of seats may have been developed with CAN communication technology and therefore communicates using this communication technology. In this lighting control unit, a eFuse actuation system SW and/or HW unit and an eFuse ($\triangleq$ HW units) are partitioned. At least one power line leads from this eFuse to the zone control unit. In the zone control unit for the roof zone, the communication tunnel control software unit, the gateway software unit and, as in the lighting control unit, one eFuse actuation system SW and/or HW unit and one eFuse ($\triangleq$ HW units) are partitioned. The zone control unit is in turn connected to the central control unit via a communication line. The communication tunnel may have Ethernet communication technology. A communication tunnel SW unit is partitioned in the central control unit. The functional logic for the interior light and thus also the actuation system of the lighting control unit for the right-hand seat in the second row of seats is partitioned in the central control unit. The central control unit can signal to the lighting control unit to flash blue from now for five seconds. The functional logic for the interior light will therefore calculate the actions necessary for this and generate a message in CAN format (communication technology of the lighting control unit). This message can be transferred to the communication tunnel control SW unit. The communication tunnel control SW unit packs the CAN message into an Ethernet frame and sends this Ethernet frame to the zone control unit of the roof zone. In the roof zone control unit, the partitioned communication tunnel control SW unit unpacks the Ethernet frame and the original CAN message is available again. The CAN message is forwarded to the gateway SW unit. The gateway SW unit can match the CAN message to its message table and assign this CAN message to the lighting control unit. The SW unit then sends the CAN message to the eFuse actuation system, indicating that the communication path to the lighting control unit is intended for this purpose. The eFuse actuation system couples the CAN message to the power line leading to the lighting control unit using a modulation method. The input coupling is carried out by direct actuation of the eFuse. The lighting control unit receives the modulated CAN message and decrypts it using the eFuse and demodulation methods. The lighting control unit then processes the CAN message and starts flashing blue for five seconds.

In addition, a motor vehicle is provided with the control unit or control device described above. The motor vehicle may be a passenger vehicle, in particular an automobile, or a commercial vehicle, such as a truck, for example. The motor vehicle may be automated. The motor vehicle may be designed to undertake longitudinal guidance and/or lateral guidance, at least partially and/or at least temporarily, by means of the control device during automated driving of the motor vehicle. Automated driving can be carried out in such a way that the motor vehicle's movement is (largely) autonomous. Automated driving can be controlled at least partially and/or temporarily by the control device.

What has been described above with reference to the control device also applies analogously to the motor vehicle and vice versa.

Furthermore, a method for transmitting control commands to at least one functional unit of a plurality of functional units in a functional zone of a motor vehicle is provided. The method may have several method steps. In a first method step, a uniform communication connection to at least one functional unit in the functional zone is established. In a further step, control commands may be transmitted to the functional unit via the uniform communication link using a communication standard. The control commands are provided, in a input-coupled manner, to the communication link by means of a modulation method by an eFuse actuation system.

The control method may be a computer-implemented method, that is to say one, several or all steps of the method can be carried out at least in part by a computer or a device for data processing, optionally the control device.

What has been described above with reference to the control device and to the motor vehicle also applies analogously to the method and vice versa.

Furthermore, a computer program comprising commands which, when the program is executed by a computer, cause the computer to execute or carry out at least in part the method described above.

A program code of the computer program may be present in any code, in particular in a code which is suitable for controlling motor vehicles.

What has been described above with reference to the control device, to the motor vehicle and to the method also applies analogously to the computer program and vice versa.

Furthermore, a computer-readable medium, in particular a computer-readable storage medium, is provided. The computer-readable medium comprises commands which, when the commands are executed by a computer, cause the computer to execute or carry out at least in part the method described above.

This means that a computer-readable medium which comprises a computer program defined above can be provided. The computer-readable media may be any digital data storage unit, such as a USB stick, a hard drive, a CD-ROM, an SD card or an SSD card (or SSD drive/SSD hard drive), for example.

The computer program does not necessarily have to be stored on such a computer-readable storage medium in order to be made available to the vehicle, but may also be obtained via the Internet or otherwise externally.

What has been described above with reference to the method, to the control device, to the computer program and to the motor vehicle also applies analogously to the computer-readable medium and vice versa.

An optional embodiment is described below with reference to FIGS. 1 to 3.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
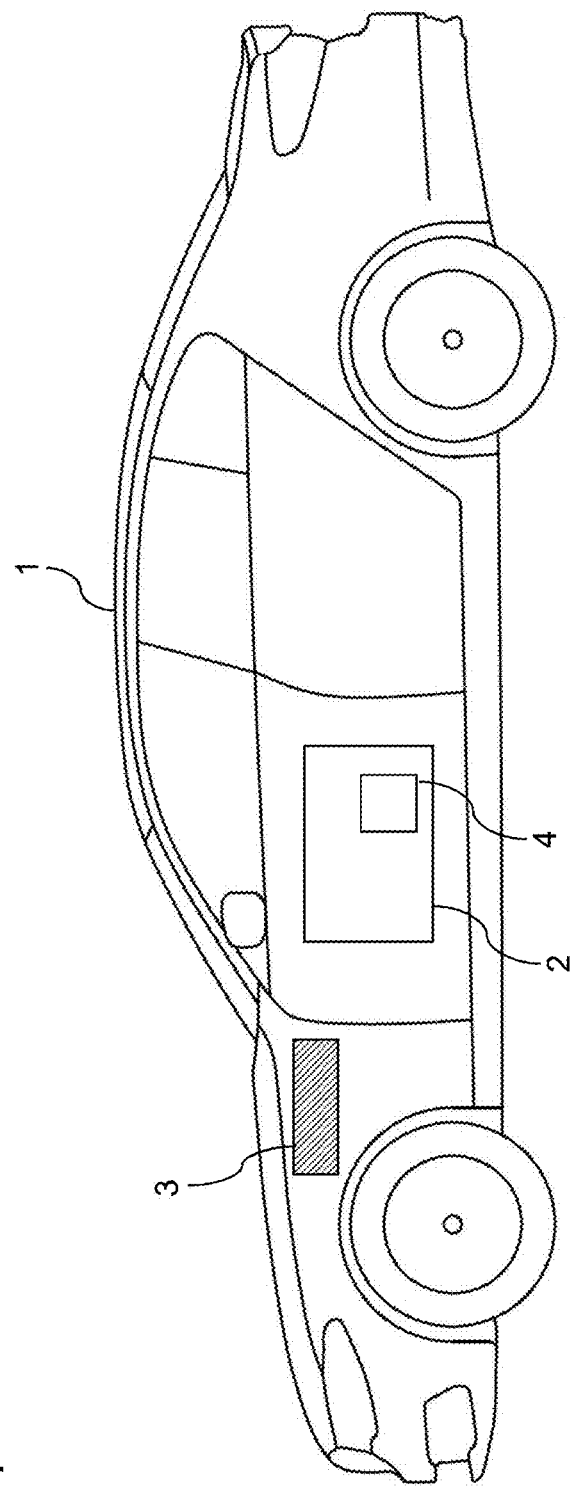
FIG. 1 schematically shows a motor vehicle having a control device of a functional zone for controlling a functional unit according to the disclosure.
Figure 2:
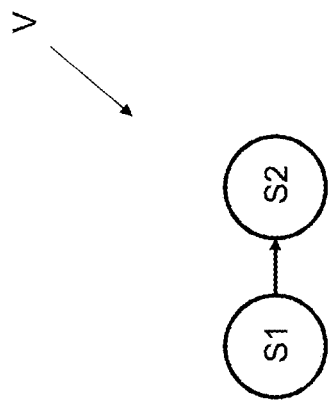
FIG. 2 schematically shows a flowchart of a method according to the disclosure for controlling the operation of the motor vehicle.
Figure 3:
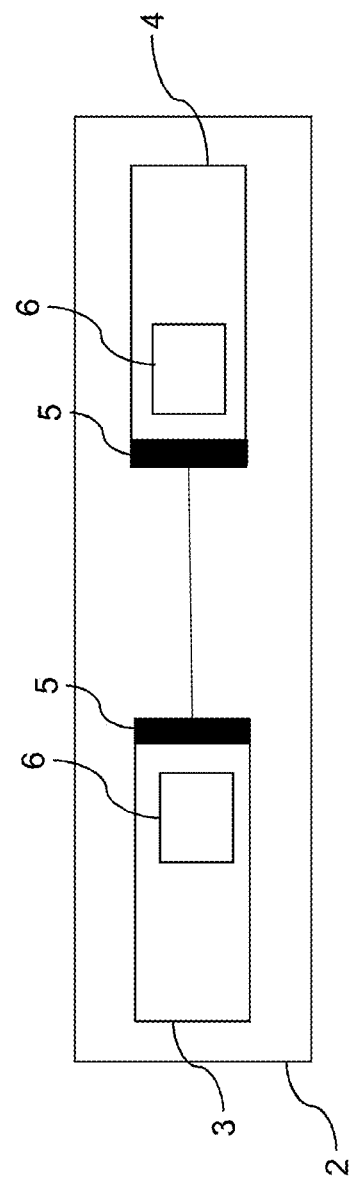
FIG. 3 schematically shows a functional zone having the control device according to the disclosure.

The motor vehicle 1 shown only schematically in FIG. 1 comprises the disclosed control device 3. The motor vehicle 1 may have a plurality of control devices 3. The control device 3 may comprise a storage unit. The motor vehicle 1 may be designed as a combustion engine motor vehicle, a BEV motor vehicle or as a PHEV motor vehicle. The motor vehicle 1 may have a plurality of functional zones 2. At least one control device 3 may be assigned to a functional zone 2. As an alternative, provision may be made for further control devices 3 to be assigned to a functional zone 2. Provision may also be made for functional units 4 to be assigned in a functional zone 2. A functional unit 4 or a plurality of functional units 4 may be assigned to a functional zone 2. The functional units 4 of a functional zone 2 may be assigned to a common technical purpose. Provision may be made for all functional units 4 of a functional zone 2 to communicate with the control device 3 using a uniform communication connection via a communication medium. The control device 3 has a uniform communication interface 5 for this purpose. Provision may be made for the function to be processed in the control device 3 and for only control commands for execution being provided to the functional units 4 by means of the uniform communication link. The control device 3 is designed to carry out the method described in detail below, also with reference to FIG. 2, for transmitting control commands to at least one functional unit 4 of a plurality of functional units 4 in a functional zone 2 of a motor vehicle 1. The method for controlling an operation of a motor vehicle 1 comprises in a first step S1 establishing a uniform communication link to at least one functional unit 4 in the functional zone 2. The establishment of the communication link may be provided as a hand-shake method in which the functional units 4 report to the control device 3 and/or vice versa. In a further step S2, provision may be made for control commands to be transmitted to the functional unit via the uniform communication link using a communication standard. The control device 3 provides control commands to the functional units 4 which execute them. Provision may be made for the function which is to be performed on the control device 3 to be determined and calculated. Provision may also be made for the function to be outsourced to a superordinate unit and calculated there. The superordinate unit provides control commands via a communication medium, the control commands being received by the control device 3 and forwarded to the corresponding functional unit 4. With reference to FIG. 3, the motor vehicle 1 may have a schematically illustrated functional zone 2. Provision may be made for the functionalities of a motor vehicle 1 to be divided into a plurality of functional zones 2. A functional zone 2 may comprise at least one control device 3 according to the disclosure. A plurality of control devices 3 may also be provided. The control device 3 is designed to control the functional unit(s) 4. The control device 3 may have a uniform communication interface 5 for establishing a communication link with a functional unit 4. Control commands may be transmitted via the communication link using a communication standard. The control device 3 according to the disclosure comprises a transmitter and receiver and/or a transceiver. The control device 3 is also configured to receive information from the functional unit 4. This may be status information, feedback information, sensor information. The communication states may include LIN, CAN, Ethernet and/or CAN-FD. The control device 3 also has an eFuse actuation system 6. By means of the eFuse actuation system 6, the control commands of the control device 3 can be coupled in onto the communication link accordingly using a modulation method. The coupling-in may be carried out galvanically, inductively, capacitively, by wave coupling, by beam coupling and/or directly by actuation of an eFuse. The eFuses comprise a transmitter and receiver and/or a transceiver. By coupling in the various communication standards onto a uniform communication link, the control device 3 may be provided with a uniform communication interface, whereby the control device 3 can be used over several generations (hardware/software). The communication link may also be formed via a two-wire cable or three-wire cable. This saves on communication lines in the motor vehicle 1. The eFuse actuation system 6 may be configured as a software unit and/or as an electronic circuit. Provision is also made for the control device 3 to have a storage unit for storing an assignment table and, in the assignment table, the control commands which can be transmitted to be assigned to the corresponding functional units 4. Provision may be made for the different functional units 4 to have a different set of control commands which can be implemented. The assignment table may be used to assign a command permanently to a functional unit 4, whereby the assignment and communication of the control commands is carried out more efficiently.

Provision may be made for the control device 3 to have a control system for a communication link to a superordinate unit. The communication link may be in the form of an Ethernet link. For this purpose, the control device 3 has a corresponding interface and gateway for converting the transmitted data. The control device 3 may comprise an eFuse or a plurality of eFuses which are converted into hardware and are controlled via the eFuse actuation system 6. The eFuse actuation system 6 may be implemented in software and/or hardware. A uniform communication link may be established via a uniform communication interface 5. The communication medium (power line) may be used to send a communication packet containing a LIN frame, a CAN frame, an Ethernet frame and/or a CAN-FD frame. The functional unit 4 may have an appropriate eFuse to convert the received frames into control commands and execute them. The functional unit 4 may comprise a transmitter and receiver and/or a transceiver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Motor vehicle
2 Functional zone
3 Control device
4 Functional units
5 Communication interface
6 eFuse actuation system
V Method
S1-S2 Method steps

What is claimed is:

1. A control device of a functional zone of a motor vehicle, comprising:
   a uniform communication interface configured to provide a uniform communication link to a functional unit of a plurality of functional units in the functional zone, wherein the control device controls the functional unit via control commands transmitted by the uniform communication link to the functional unit using a communication standard; and
   at least one eFuse actuation system configured to couple the control commands into the communication link via a modulation method.

2. The control device of claim 1, wherein the communication standard is selected from a group comprising at least LIN, CAN, Ethernet and/or CAN-FD.

3. The control device of claim 1, wherein the coupling-in is carried out galvanically, inductively, capacitively, by wave coupling, by beam coupling and/or directly by actuation of an eFuse.

4. The control device of claim 1, wherein the eFuse actuation system is designed as a software unit and/or as an electronic circuit.

5. The control device of claim 1, wherein the communication link is designed as a two-wire cable or a three-wire cable.

6. The control device of claim 1, wherein the control device has a storage unit for storing an assignment table and, in the assignment table, the control commands which can be transmitted are assigned to the corresponding functional units.

7. A motor vehicle, comprising:
   the control device of claim 1.

8. A method for transmitting control commands to at least one functional unit of a plurality of functional units in a functional zone of a motor vehicle, wherein the method comprises:
   establishing a uniform communication link to a functional unit of the plurality of functional units in the functional zone;
   coupling control commands for controlling the functional unit into the communication link by an eFuse actuation system via a modulation method; and
   transmitting the control commands to the functional unit via the uniform communication link using a communication standard.

9. A computer program comprising instructions that, when executed by a computer, cause the computer to execute the method of claim 8.

10. A non-transitory computer-readable medium comprising instructions that, when executed by a computer, cause the computer to execute the method of claim 8.

* * * * *